US008454439B2

(12) United States Patent
Otani et al.

(10) Patent No.: US 8,454,439 B2
(45) Date of Patent: *Jun. 4, 2013

(54) GAME DEVICE, GAME DEVICE CONTROL METHOD, PROGRAM, AND INFORMATION STORAGE MEDIUM

(75) Inventors: Taku Otani, Tokyo (JP); Yutaka Nishino, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/382,828

(22) PCT Filed: Feb. 24, 2010

(86) PCT No.: PCT/JP2010/052894
§ 371 (c)(1),
(2), (4) Date: Jan. 6, 2012

(87) PCT Pub. No.: WO2011/004630
PCT Pub. Date: Jan. 13, 2011

(65) Prior Publication Data
US 2012/0115610 A1 May 10, 2012

(30) Foreign Application Priority Data
Jul. 7, 2009 (JP) .................................. 2009-161139

(51) Int. Cl.
*A63F 9/00* (2006.01)
(52) U.S. Cl.
USPC ........... 463/36; 463/1; 463/7; 463/30; 463/37
(58) Field of Classification Search
USPC ....................................... 463/1, 7, 30, 36–37
See application file for complete search history.

(56) References Cited

U.S. PATENT DOCUMENTS

| 2003/0144045 A1* | 7/2003 | Fujita ................................ 463/1 |
| 2007/0211025 A1 | 9/2007 | Sato |
| 2010/0234103 A1* | 9/2010 | Matsumaru ..................... 463/30 |

FOREIGN PATENT DOCUMENTS

| JP | 2007-241655 A | 9/2007 |
| JP | 2008-136697 A | 6/2008 |
| JP | 2008-194282 A | 8/2008 |

OTHER PUBLICATIONS

International Search Report of PCT/JP2010/052894, dated May 18, 2010.

*Primary Examiner* — Dmitry Suhol
*Assistant Examiner* — David Duffy
(74) *Attorney, Agent, or Firm* — Sughrue Mion, PLLC

(57) ABSTRACT

Provided is a game device, which is capable of preventing a subject to be operated from performing an action that is not intended by a player. A game device (10) executes a game configured so that at least one of a subject to be operated by a player and an object or a character moves within a game space. Numerical value information acquiring means (51) acquires numerical value information corresponding to a motion of the player. Control means (52) causes the subject to be operated to perform an action corresponding to a case where a positional relationship between the subject to be operated and the object or the character is a first positional relationship in a case where the numerical value information satisfies a condition. Condition changing means (55) changes the above-mentioned condition based on the positional relationship between the subject to be operated and the object or the character. The condition changing means (55) makes a setting so that the numerical value information is less likely to satisfy the above-mentioned condition for a case where the positional relationship between the subject to be operated and the object or the character is a second positional relationship than to satisfy the above-mentioned condition for the case where the positional relationship between the subject to be operated and the object or the character is the first positional relationship.

20 Claims, 7 Drawing Sheets

GAME DEVICE, GAME DEVICE CONTROL METHOD, PROGRAM, AND INFORMATION STORAGE MEDIUM

TECHNICAL FIELD

The present invention relates to a game device, a method of controlling a game device, a program, and an information storage medium.

BACKGROUND ART

There is known a game device which obtains numerical value information based on a motion of a player and causes a subject to be operated to perform an action based on the numerical value information. For example, there is known a game device including a stick-shaped controller incorporating an acceleration sensor (for example, Patent Literature 1). With such a game device, it is possible to acquire a detection result of the acceleration sensor as the numerical value information, determine whether or not a player has swung the controller based on the numerical value information, and cause a game character to perform an action based on a judgment result thereof.

Therefore, examples of a game realized by such a game device as described above include a tennis game configured so that the game character swings a racket (bat, paddle) when the player swings the controller in the same manner as an actual racket. In this game, the game character swings the racket forehand when the player swings the controller forehand, while the game character swings the racket backhand when the player swings the controller backhand.

PRIOR ART DOCUMENT

Patent Document

[Patent Document 1] JP 2007-241655 A

DISCLOSURE OF THE INVENTION

Problems to be Solved by the Invention

For example, a player of such a game as described above may perform a backswing when trying to swing a controller forehand. A motion of the controller at this time is similar to a motion at a time when the controller is swung backhand, and a detection result of an acceleration sensor may also be similar to the detection result obtained when the controller is swung backhand. When the player performs a backswing in an attempt to swing the controller forehand, if a game character performs an action of swinging a racket backhand, the game character performs an action that is not intended by the player. As a result, the player may feel dissatisfied.

The present invention has been made in view of the above-mentioned problem, and an object thereof is to provide a game device, a method of controlling a game device, a program, and an information storage medium, which are capable of preventing a subject to be operated from performing an action that is not intended by a player.

Means for Solving the Problems

In order to solve the above-mentioned problem, according to the present invention, there is provided a game device which executes a game configured so that at least one of a subject to be operated by a player and an object or a character moves within a game space, including: numerical value information acquiring means for acquiring numerical value information corresponding to a motion of the player; control means for causing the subject to be operated to perform an action corresponding to a case where a positional relationship between the subject to be operated and the object or the character is a first positional relationship in a case where the numerical value information satisfies a condition; and condition changing means for changing the condition based on the positional relationship between the subject to be operated and the object or the character and making a setting so that the numerical value information is less likely to satisfy the condition for a case where the positional relationship between the subject to be operated and the object or the character is a second positional relationship than to satisfy the condition for the case where the positional relationship between the subject to be operated and the object or the character is the first positional relationship.

According to the present invention, there is also provided a method of controlling a game device, which executes a game configured so that at least one of a subject to be operated by a player and an object or a character moves within a game space, including: a numerical value information acquiring step of acquiring numerical value information corresponding to a motion of the player; a control step of causing the subject to be operated to perform an action corresponding to a case where a positional relationship between the subject to be operated and the object or the character is a first positional relationship in a case where the numerical value information satisfies a condition; and a condition changing step of changing the condition based on the positional relationship between the subject to be operated and the object or the character and making a setting so that the numerical value information is less likely to satisfy the condition for a case where the positional relationship between the subject to be operated and the object or the character is a second positional relationship than to satisfy the condition for the case where the positional relationship between the subject to be operated and the object or the character is the first positional relationship.

According to the present invention, there is also provided a program for causing a computer, such as a consumer game machine (stationary game machine), a portable game machine, an arcade game machine, a mobile phone, a personal digital assistant (PDA), or a personal computer, to function as a game device, which executes a game configured so that at least one of a subject to be operated by a player and an object or a character moves within a game space, the program further causing the computer to function as: numerical value information acquiring means for acquiring numerical value information corresponding to a motion of the player; control means for causing the subject to be operated to perform an action corresponding to a case where a positional relationship between the subject to be operated and the object or the character is a first positional relationship in a case where the numerical value information satisfies a condition; and condition changing means for changing the condition based on the positional relationship between the subject to be operated and the object or the character and making a setting so that the numerical value information is less likely to satisfy the condition for a case where the positional relationship between the subject to be operated and the object or the character is a second positional relationship than to satisfy the condition for the case where the positional relationship between the subject to be operated and the object or the character is the first positional relationship.

Further, an information storage medium according to the present invention is a computer-readable information storage medium storing the above-mentioned program.

According to the present invention, it is possible to prevent the subject to be operated from performing an action that is not intended by the player.

Further, according to an aspect of the present invention, the control means may cause the subject to be operated to perform the action corresponding to the case where the positional relationship between the subject to be operated and the object or the character is the first positional relationship in a case where a numerical value obtained based on the numerical value information is larger than a reference value. The condition changing means may set the reference value for the case where the positional relationship between the subject to be operated and the object or the character is the second positional relationship to a value larger than the reference value for the case where the positional relationship between the subject to be operated and the object or the character is the first positional relationship.

Further, according to an aspect of the present invention, the control means may cause the subject to be operated to perform the action corresponding to the case where the positional relationship between the subject to be operated and the object or the character is the first positional relationship in a case where a numerical value obtained based on the numerical value information is smaller than a reference value. The condition changing means may set the reference value for the case where the positional relationship between the subject to be operated and the object or the character is the second positional relationship to a value smaller than the reference value for the case where the positional relationship between the subject to be operated and the object or the character is the first positional relationship.

Further, according to an aspect of the present invention, the condition changing means may include means for changing the condition based on a moving speed of the object or the character.

MODE FOR CARRYING OUT THE INVENTION

Hereinafter, detailed description is given of an example of an embodiment of the present invention with reference to the drawings. A game device according to the embodiment of the present invention is implemented by, for example, a consumer game machine (stationary game machine), a portable game machine, a mobile phone, a personal digital assistant (PDA), or a personal computer. Here, description is given of a case where the game device according to the embodiment of the present invention is implemented by a consumer game machine.

Figure 1:
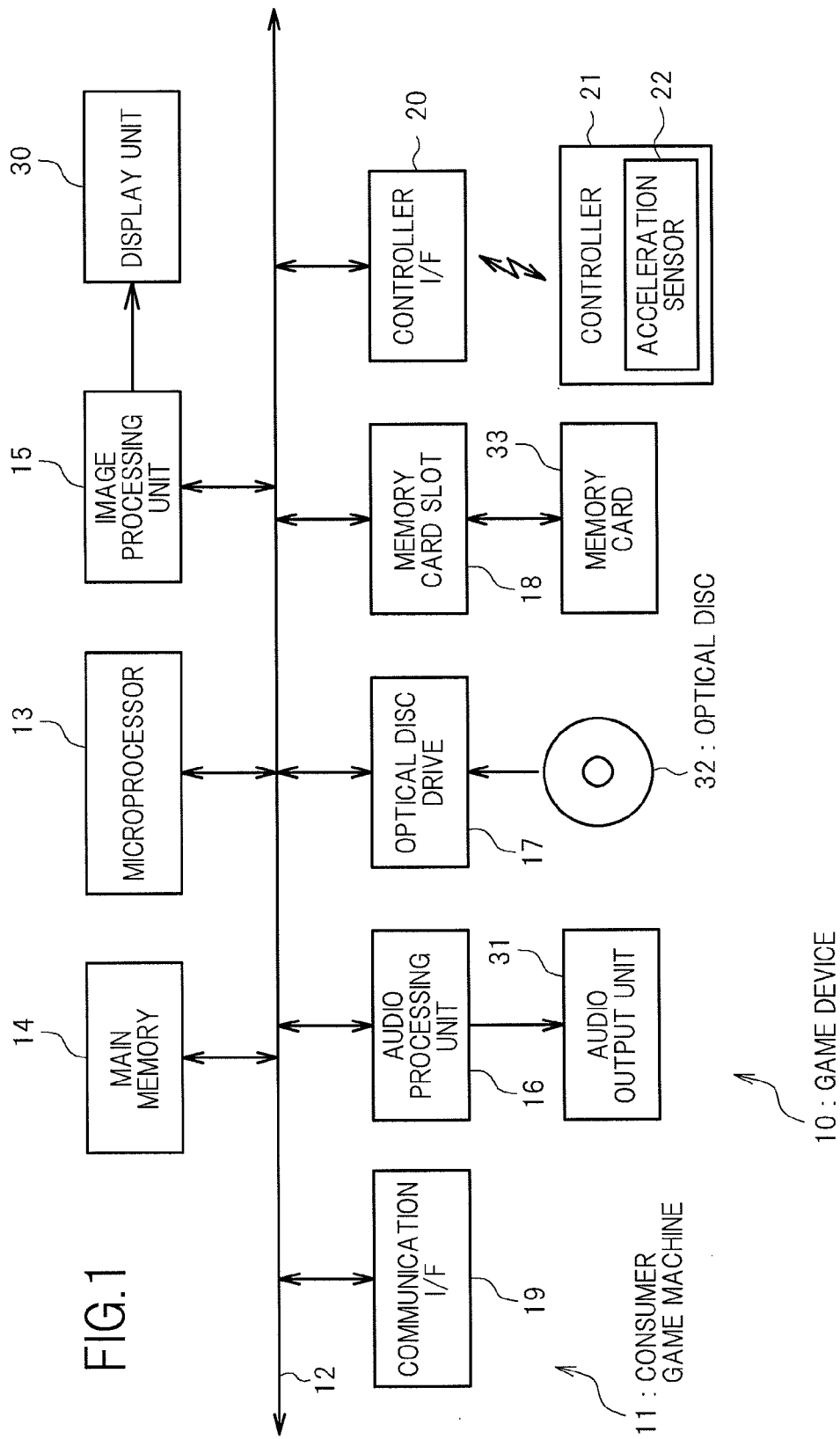
FIG. 1 A diagram illustrating a hardware configuration of a game device according to an embodiment of the present invention.

FIG. 1 illustrates a hardware configuration of the game device according to the embodiment of the present invention. As illustrated in FIG. 1, a game device 10 according to the embodiment of the present invention includes a consumer game machine 11, a display unit 30, an audio output unit 31, an optical disc 32, and a memory card 33. The display unit 30 and the audio output unit 31 are connected to the consumer game machine 11. For example, a consumer television set is used as the display unit 30, and a speaker built into the consumer television set is used as the audio output unit 31. The optical disc 32 and the memory card 33 are information storage media, and are mounted to the consumer game machine 11.

The consumer game machine 11 is a well-known computer game system. The consumer game machine 11 includes a bus 12, a microprocessor 13, a main memory 14, an image processing unit 15, an audio processing unit 16, an optical disc drive 17, a memory card slot 18, a communication interface (I/F) 19, a controller interface (I/F) 20, and a controller 21.

The bus 12 is provided for exchanging addresses and data among the units of the consumer game machine 11. The microprocessor 13, the main memory 14, the image processing unit 15, the audio processing unit 16, the optical disc drive 17, the memory card slot 18, the communication interface 19, and the controller interface 20 are connected via the bus 12 so as to communicate data with one another.

The microprocessor 13 executes various kinds of information processing based on an operating system stored in a ROM (not shown) and a program read from the optical disc 32 or the memory card 33. The main memory 14 includes, for example, a RAM. The program or data read from the optical disc 32 or the memory card 33 are written in the main memory 14 if necessary. The main memory 14 is also used for working memory of the microprocessor 13.

The image processing unit 15 includes a VRAM, and renders, based on image data sent from the microprocessor 13, a game screen in the VRAM. Then, the image processing unit 15 converts the game screen into video signals and outputs the video signals to the display unit 30 at predetermined times. The audio processing unit 16 includes a sound buffer and outputs, from the audio output unit 31, various kinds of sound data (game music, game sound effect, message, and the like) read from the optical disc 32 to the sound buffer.

The optical disc drive 17 reads the program or data recorded on the optical disc 32. In this case, the optical disc 32 is used for supplying the program or data to the consumer game machine 11, but any other information storage medium such as the memory card 33 may also be used. Further, the program or data may also be supplied to the consumer game machine 11 via a data communication network such as the Internet.

The memory card slot 18 is an interface for mounting the memory card 33. The memory card 33 includes a nonvolatile memory (for example, EEPROM), and stores various kinds of game data such as saved data. The communication interface 19 is an interface for communicative connection to the data communication network such as the Internet.

The controller interface 20 is an interface for allowing the controller 21 to perform wireless connection. It is possible to use, for example, an interface conforming to the Bluetooth (registered trademark) interface standards as the controller interface 20. Note that the controller interface 20 may be an interface for allowing the controller 21 to perform wired connection.

Figure 2:
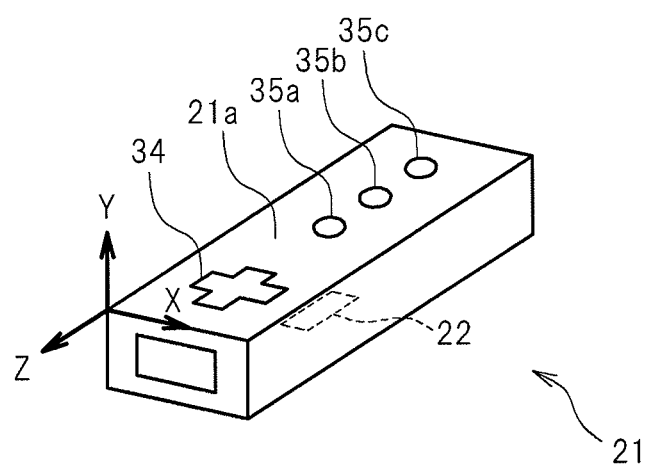
FIG. 2 A diagram illustrating an example of a controller.

FIG. 2 is a diagram illustrating an example of the controller 21. The controller 21 is an operation unit for receiving a player's operation. As illustrated in FIG. 2, the controller 21 is a stick-type controller, and includes a direction button 34 and buttons 35a, 35b, and 35c.

In addition, the controller 21 includes an acceleration sensor 22. The acceleration sensor 22, for example, detects accelerations in an X-axis direction, a Y-axis direction, and a Z-axis direction, which are orthogonal to one another, and outputs a numerical value indicating a detection result thereof. For example, as illustrated in FIG. 2, the X-axis direction corresponds to a shorter side direction of the controller 21, and the Z-axis direction corresponds to a longer side direction of the controller 21. Further, the Y-axis direction corresponds to a normal direction of a surface 21a of the controller 21.

An operation signal indicating a state of the controller 21 is transmitted every predetermined cycle (for example, every $\frac{1}{60}$th of a second) from the controller 21 to the microprocessor 13 via the controller interface 20. The operation signal includes, for example, identification information for identifying the controller 21, information indicating depressed states of the respective buttons, and information indicating the detection result of the acceleration sensor 22. For example, the microprocessor 13 can judge a motion of the controller 21 based on the operation signal (detection result of the acceleration sensor 22).

Figure 3:
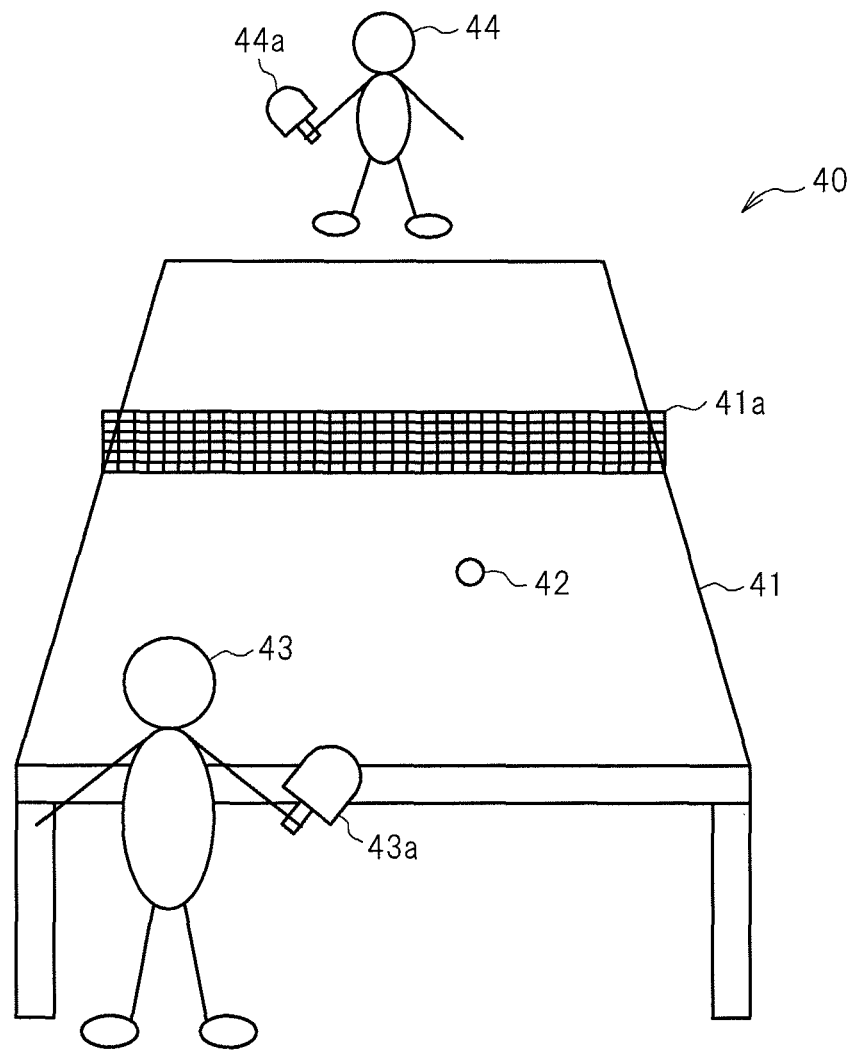
FIG. 3 A diagram illustrating an example of a game space.

Executed on the game device 10 is, for example, a table tennis game. In order to realize the table tennis game, a game space 40 is built in the main memory 14. FIG. 3 illustrates an example of the game space 40. As illustrated in FIG. 3, a table-tennis table 41 that is an object expressing a table-tennis table is located in the game space 40. The table-tennis table 41 includes a net 41a.

Further, a ball 42 (object) that is an object expressing a ball for a table tennis, a player character 43 (subject to be operated) that is an object expressing a table tennis player corresponding to the game player, and an opponent character 44 that is an object expressing an opponent table tennis player move within the game space 40. The player character 43 is holding a bat (paddle, racket) 43a for the table tennis, and the opponent character 44 is also holding a bat 44a for the table tennis.

Further, a virtual camera 45 is set in the game space 40. A game screen expressing a scene of the game space 40 viewed from the virtual camera 45 is displayed on the display unit 30. Note that the virtual camera 45 may be set in a position of an eye of the player character 43. In this manner, the scene of the game space 40 viewed from the player character 43 may be displayed on the game screen.

Figure 4:
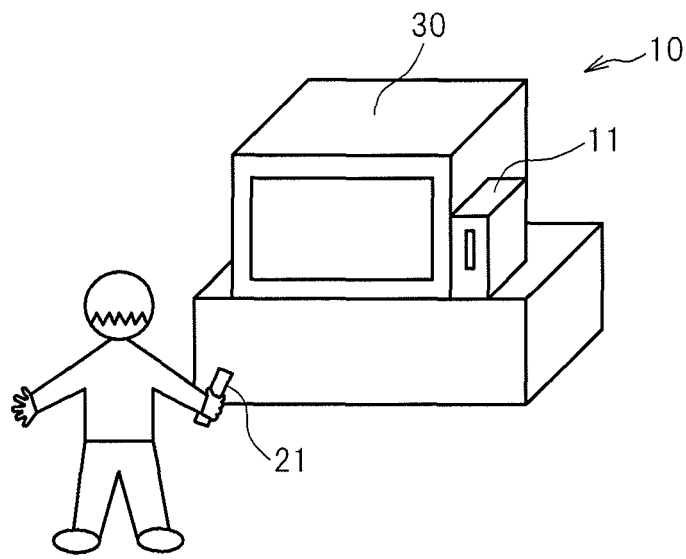
FIG. 4 A diagram illustrating how a player plays a game.

FIG. 4 is a diagram illustrating how the player plays the game. As illustrated in FIG. 4, the player stands in front of the display unit 30, and plays the game by holding the controller 21 with one hand. Note that a screen that allows the player to specify which hand to hold the controller 21 with is displayed before a match is started, and the player specifies the hand to hold the controller 21 with. The player character 43 holds the bat 43a with the right hand in a case where the player holds the controller 21 with the right hand, and the player character 43 holds the bat 43a with the left hand in a case where the player holds the controller 21 with the left hand.

In the table tennis game, the player character 43 moves in accordance with control performed by the computer. Therefore, the player concentrates on an operation for causing the player character 43 to swing the bat 43a. The player swings the controller 21 in the same way that the player swings an actual table tennis bat at a time at which the player character 43 and the ball 42 approach each other.

For example, when the player swings the controller 21 forehand, the player character 43 swings the bat 43a forehand as well. Further, for example, when the player swings the controller 21 backhand, the player character 43 swings the bat 43a backhand as well.

Hereinafter, description is given of a technology for preventing the player character 43 from performing an action that is not intended by the player in the above-mentioned table tennis game.

Figure 5:
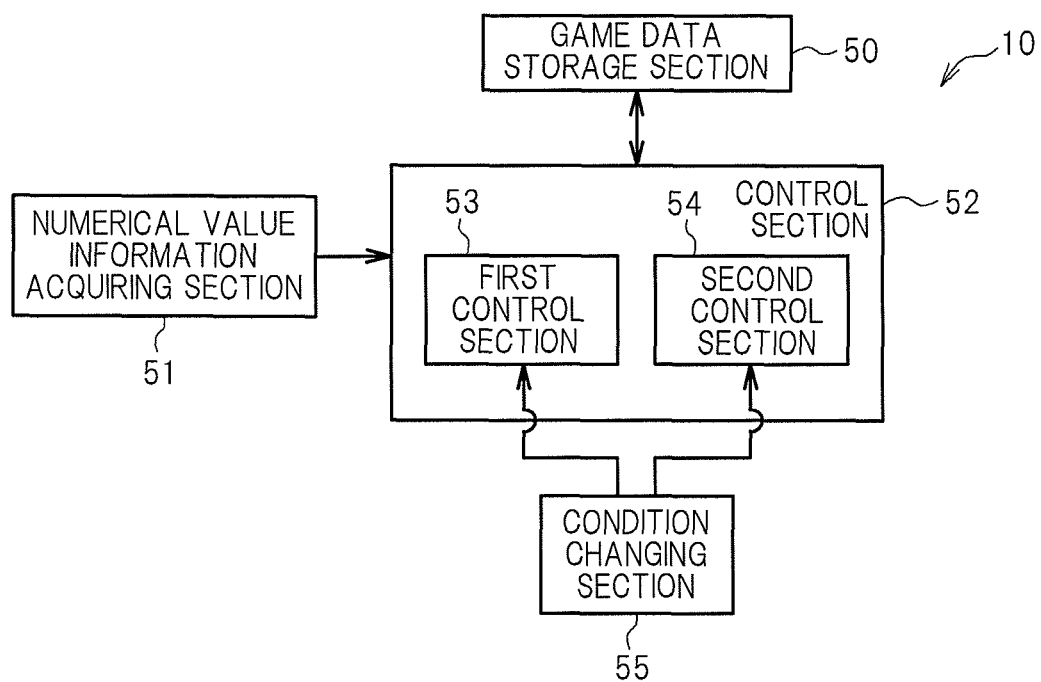
FIG. 5 A functional block diagram illustrating the game device according to the embodiment of the present invention.

FIG. 5 is a functional block diagram mainly illustrating functions related to the present invention among the functions implemented by the game device 10. As illustrated in FIG. 5, the game device 10 includes a game data storage section 50, a numerical value information acquiring section 51, a control section 52, and a condition changing section 55. The game data storage section 50 is implemented by, for example, the main memory 14 and the optical disc 32, and the numerical value information acquiring section 51, the control section 52, and the condition changing section 55 are implemented by, for example, the microprocessor 13 executing the program stored on the optical disc 32.

The game data storage section 50 stores data necessary to execute the game. For example, the game data storage section 50 stores data indicating a current situation of the table tennis game. For example, the following data is stored.

(1) data indicating a state (such as position, moving direction, and moving speed) of the ball 42

(2) data indicating a state (such as position, posture, and moving direction) of the player character 43

(3) data indicating a state (such as position, posture, and moving direction) of the opponent character 44

The numerical value information acquiring section 51 acquires numerical value information corresponding to a motion of the player. In the case of this embodiment, the numerical value information acquiring section 51 acquires the detection result of the acceleration sensor 22 of the controller 21 as the numerical value information corresponding to the motion of the player.

The control section 52 executes control of the player character 43. For example, the control section 52 causes the player character 43 to move based on the position of the ball 42. That is, the control section 52 causes the player character 43 to move so that the player character 43 can hit back the ball 42.

Further, based on the numerical value information acquired by the numerical value information acquiring section 51, the control section 52 causes the player character 43 to perform an action. The control section 52 includes a first control section 53 and a second control section 54.

In a case where the numerical value information acquired by the numerical value information acquiring section 51 satisfies a first condition, the first control section 53 causes the player character 43 to perform a first action corresponding to a case where a positional relationship between the player character 43 and the ball 42 is a first positional relationship.

In the case of this embodiment, in the case where the numerical value information acquired by the numerical value information acquiring section 51 satisfies the first condition, the first control section 53 causes the player character 43 to perform an action of swinging the bat 43a forehand. That is, in the case of this embodiment, the "first action" refers to the action of swinging the bat 43a forehand. Further, the "case where a positional relationship between the player character 43 and the ball 42 is a first positional relationship" refers to a case where the positional relationship between the player character 43 and the ball 42 is a positional relationship that makes it more advantageous for the player character 43 to hit the ball 42 forehand.

The "case where the positional relationship between the player character 43 and the ball 42 is a positional relationship that makes it more advantageous for the player character 43 to hit the ball 42 forehand" refers to a case where the player character 43 should hit the ball 42 forehand, and more specifically, to a case where the ball 42 is moving toward an area on a side of the hand with which the player character 43 is holding the bat 43a or a case where the ball 42 is positioned within the area on the side of the hand with which the player character 43 is holding the bat 43a.

Further, in the case of this embodiment, the "first condition" refers to a condition as to whether or not the player has swung the controller 21 forehand. The "first condition" refers to a condition regarding the numerical value information (detection result of the acceleration sensor 22) acquired by the numerical value information acquiring section 51. For example, the "first condition" includes a condition as to whether or not a first numerical value obtained based on the detection result of the acceleration sensor 22 is larger than a first reference value. Hereinafter, the "first condition" is described in detail.

For example, whether or not the player has swung the controller 21 forehand is determined by comparing a changing pattern of the detection results of the acceleration sensor 22 within a period between the present time and a predetermined time before and a standard changing pattern of the detection results of the acceleration sensor 22 obtained when the controller 21 is swung forehand. For example, in a case where there is a high similarity between the changing pattern of the detection results of the acceleration sensor 22 within the period between the present time and the predetermined time before and the standard changing pattern of the detection results of the acceleration sensor 22 obtained when the controller 21 is swung forehand, it is determined that the player has swung the controller 21 forehand.

Therefore, in the case of this embodiment, the "first condition" refers to a condition as to whether or not the similarity (first numerical value) between the changing pattern of the detection results of the acceleration sensor 22 within the period between the present time and the predetermined time before and the standard changing pattern of the detection results of the acceleration sensor 22 is larger than a first reference similarity (first reference value). Note that, a plurality of types of standard changing pattern of the detection results of the acceleration sensor 22 are stored in consideration of the fact that the player holds the controller 21 in various ways. For example, the standard changing pattern of the detection results of the acceleration sensor 22 obtained when the controller 21 is swung forehand by being held with the right hand and the standard changing pattern of the detection results of the acceleration sensor 22 obtained when the controller 21 is swung forehand by being held with the left hand are stored.

For example, the changing pattern of the detection results of the acceleration sensor 22 obtained when the controller 21 is swung forehand by being held with the right hand is acquired in advance and used as the standard changing pattern of the detection results of the acceleration sensor 22 obtained when the controller 21 is held with the right hand. In the same manner, the changing pattern of the detection results of the acceleration sensor 22 obtained when the controller 21 is swung forehand by being held with the left hand is acquired in advance and used as the standard changing pattern of the detection results of the acceleration sensor 22 obtained when the controller 21 is held with the left hand.

In a case where the numerical value information acquired by the numerical value information acquiring section 51 satisfies a second condition, the second control section 54 causes the player character 43 to perform a second action corresponding to a case where a positional relationship between the player character 43 and the ball 42 is a second positional relationship.

In the case of this embodiment, in the case where the numerical value information acquired by the numerical value information acquiring section 51 satisfies the second condition, the second control section 54 causes the player character 43 to perform an action of swinging the bat 43a backhand. That is, in the case of this embodiment, the "second action" refers to the action of swinging the bat 43a backhand. Further, the "case where a positional relationship between the player character 43 and the ball 42 is a second positional relationship" refers to a case where the positional relationship between the player character 43 and the ball 42 is a positional relationship that makes it more advantageous for the player character 43 to hit the ball 42 backhand.

The "case where the positional relationship between the player character 43 and the ball 42 is a positional relationship that makes it more advantageous for the player character 43 to hit the ball 42 backhand" refers to a case where the player character 43 should hit the ball 42 backhand, and more specifically, to a case where the ball 42 is moving toward an area on a side of the hand with which the player character 43 is not holding the bat 43a or a case where the ball 42 is positioned within the area on the side of the hand with which the player character 43 is not holding the bat 43a.

Further, in the case of this embodiment, the "second condition" refers to a condition as to whether or not the player has swung the controller 21 backhand. The "second condition" refers to a condition regarding the numerical value information (detection result of the acceleration sensor 22) acquired by the numerical value information acquiring section 51. For example, the "second condition" includes a condition as to whether or not a second numerical value obtained based on the detection result of the acceleration sensor 22 is larger than a second reference value. Hereinafter, the "second condition" is described in detail.

For example, whether or not the player has swung the controller 21 backhand is determined by comparing a changing pattern of the detection results of the acceleration sensor 22 within a period between the present time and a predetermined time before and a standard changing pattern of the detection results of the acceleration sensor 22 obtained when the controller 21 is swung backhand. For example, in a case where there is a high similarity between the changing pattern of the detection results of the acceleration sensor 22 within the period between the present time and the predetermined time before and the standard changing pattern of the detection results of the acceleration sensor 22 obtained when the controller 21 is swung backhand, it is determined that the player has swung the controller 21 backhand.

Therefore, in the case of this embodiment, the "second condition" refers to a condition as to whether or not the similarity (second numerical value) between the changing pattern of the detection results of the acceleration sensor 22 within the period between the present time and the predetermined time before and the standard changing pattern of the detection results of the acceleration sensor 22 is larger than a second reference similarity (second reference value). Note that a plurality of types of standard changing pattern of the detection results of the acceleration sensor 22 are stored in consideration of the fact that the player holds the controller 21 in various ways. For example, the standard changing pattern of the detection results of the acceleration sensor 22 obtained when the controller 21 is swung backhand by being held with the right hand and the standard changing pattern of the detection results of the acceleration sensor 22 obtained when the controller 21 is swung backhand by being held with the left hand are stored.

For example, the changing pattern of the detection results of the acceleration sensor 22 obtained when the controller 21 is swung backhand by being held with the right hand is acquired in advance and used as the standard changing pattern of the detection results of the acceleration sensor 22 obtained when the controller 21 is held with the right hand. In the same manner, the changing pattern of the detection results of the acceleration sensor 22 obtained when the controller 21 is swung backhand by being held with the left hand is acquired in advance and used as the standard changing pattern of the detection results of the acceleration sensor 22 obtained when the controller 21 is held with the left hand.

The condition changing section 55 changes the first condition based on the positional relationship between the player character 43 and the ball 42. For example, the condition changing section 55 makes such a setting that the numerical value information acquired by the numerical value information acquiring section 51 is less likely to satisfy the first condition for a case where the positional relationship between the player character 43 and the ball 42 is the second positional relationship than to satisfy the first condition for a case where the positional relationship between the player character 43 and the ball 42 is the first positional relationship.

Here, description is given of a case where the first condition is the condition as to whether or not the similarity between the changing pattern of the detection results of the acceleration sensor 22 within the period between the present time and the predetermined time before and the standard changing pattern of the detection results of the acceleration sensor 22 obtained when the controller 21 is swung forehand is larger than the first reference similarity. In this case, the condition changing section 55 sets the first reference similarity for the case where the positional relationship between the player character 43 and the ball 42 is the second positional relationship to a higher similarity (for example, R2: R1<R2) than the first reference similarity (for example, R1) for the case where the positional relationship between the player character 43 and the ball 42 is the first positional relationship.

According to the above-mentioned function of the condition changing section 55, the first condition is set so that the numerical value information acquired by the numerical value information acquiring section 51 is less likely to satisfy the first condition in the case where the positional relationship between the player character 43 and the ball 42 is the second positional relationship (for example, the case where the ball 42 is moving toward the area on a side of the hand with which the player character 43 is not holding the bat 43a). Therefore, the player character 43 becomes less likely to perform the first action (action of swinging the bat 43a forehand).

The player may perform a backswing when trying to swing the controller 21 backhand. A motion of the controller 21 at this time may be similar to a motion at a time when the controller 21 is swung forehand. Therefore, the changing pattern of the detection results of the acceleration sensor 22 at this time may also be similar to the standard changing pattern of the detection results of the acceleration sensor 22 obtained when the controller 21 is swung forehand.

When the player performs a backswing in an attempt to swing the controller 21 backhand, if the player character 43 performs the action of swinging the bat 43a forehand, the player character 43 performs an action that is not intended by the player. As a result, the player may feel dissatisfied.

Further, in a case where the ball 42 is moving toward the area on the side of the hand with which the player character 43 is not holding the bat 43a while the player is trying to swing the controller 21 forehand, the player changes their posture from a posture adopted when trying to swing controller 21 forehand to a posture adopted when trying to swing controller 21 backhand. The motion of the controller 21 at this time may be similar to the motion of the controller 21 at the time when the controller 21 is swung forehand. Therefore, the changing pattern of the detection results of the acceleration sensor 22 at this time may also be similar to the standard changing pattern of the detection results of the acceleration sensor 22 obtained when the controller 21 is swung forehand.

When the player changes their posture from the posture adopted when trying to swing controller 21 forehand to the posture adopted when trying to swing controller 21 backhand, if the player character 43 performs the action of swinging the bat 43a forehand, the player character 43 performs an action that is not intended by the player. As a result, the player may feel dissatisfied.

In this respect, according to the above-mentioned function of the condition changing section 55, such a setting is made that the numerical value information acquired by the numerical value information acquiring section 51 is less likely to satisfy the first condition in the case where the positional relationship between the player character 43 and the ball 42 is the second positional relationship (for example, the case where the ball 42 is moving toward the area on the side of the hand with which the player character 43 is not holding the bat 43a). Therefore, the player character 43 becomes less likely to perform the first action (action of swinging the bat 43a forehand). As a result, the player character 43 becomes less likely to perform an action that is not intended by the player.

Further, the condition changing section 55 changes the second condition based on the positional relationship between the player character 43 and the ball 42. For example, the condition changing section 55 makes such a setting that the numerical value information acquired by the numerical value information acquiring section 51 is less likely to satisfy the second condition for a case where the positional relationship between the player character 43 and the ball 42 is the first positional relationship than the second condition for a case where the positional relationship between the player character 43 and the ball 42 is the second positional relationship.

Here, description is given of a case where the second condition is the condition as to whether or not the similarity between the changing pattern of the detection results of the acceleration sensor 22 within the period between the present time and the predetermined time before and the standard changing pattern of the detection results of the acceleration sensor 22 obtained when the controller 21 is swung backhand is larger than the second reference similarity. In this case, the condition changing section 55 sets the second reference similarity for the case where the positional relationship between the player character 43 and the ball 42 is the first positional relationship to a higher similarity (for example, R2: R1<R2) than the second reference similarity (for example, R1) for the case where the positional relationship between the player character 43 and the ball 42 is the second positional relationship.

According to the above-mentioned function of the condition changing section 55, the second condition is set so that the numerical value information acquired by the numerical value information acquiring section 51 is less likely to satisfy the second condition in the case where the positional relationship between the player character 43 and the ball 42 is the first positional relationship (for example, the case where the ball 42 is moving toward the area on the side of the hand with which the player character 43 is holding the bat 43a). Therefore, the player character 43 becomes less likely to perform the second action (action of swinging the bat 43a backhand).

The player may perform a backswing when trying to swing the controller 21 forehand. A motion of the controller 21 at this time may be similar to a motion at a time when the controller 21 is swung backhand. Therefore, the changing pattern of the detection results of the acceleration sensor 22 at this time may also be similar to the standard changing pattern of the detection results of the acceleration sensor 22 obtained when the controller 21 is swung backhand.

When the player performs a backswing in an attempt to swing the controller 21 forehand, if the player character 43 performs the action of swinging the bat 43a backhand, the player character 43 performs an action that is not intended by the player. As a result, the player may feel dissatisfied.

Further, in a case where the ball 42 is moving toward the area on the side of the hand with which the player character 43 is holding the bat 43a while the player is trying to swing the controller 21 backhand, the player changes their posture from a posture adopted when trying to swing controller 21 backhand to a posture adopted when trying to swing controller 21 forehand. The motion of the controller 21 at this time may be similar to the motion of the controller 21 at the time when the controller 21 is swung backhand. Therefore, the changing pattern of the detection results of the acceleration sensor 22 at this time may also be similar to the standard changing pattern of the detection results of the acceleration sensor 22 obtained when the controller 21 is swung backhand.

When the player changes their posture from the posture adopted when trying to swing controller 21 backhand to the posture adopted when trying to swing controller 21 forehand, if the player character 43 performs the action of swinging the bat 43a backhand, the player character 43 performs an action that is not intended by the player. As a result, the player may feel dissatisfied.

In this respect, according to the condition changing section 55, such a setting is made that the numerical value information acquired by the numerical value information acquiring section 51 is less likely to satisfy the second condition in the case where the positional relationship between the player character 43 and the ball 42 is the first positional relationship (for example, the case where the ball 42 is moving toward the area on the side of the hand with which the player character 43 is holding the bat 43a). Therefore, the player character 43 becomes less likely to perform the second action (action of swinging the bat 43a backhand). As a result, the player character 43 becomes less likely to perform an action that is not intended by the player.

Figure 6:
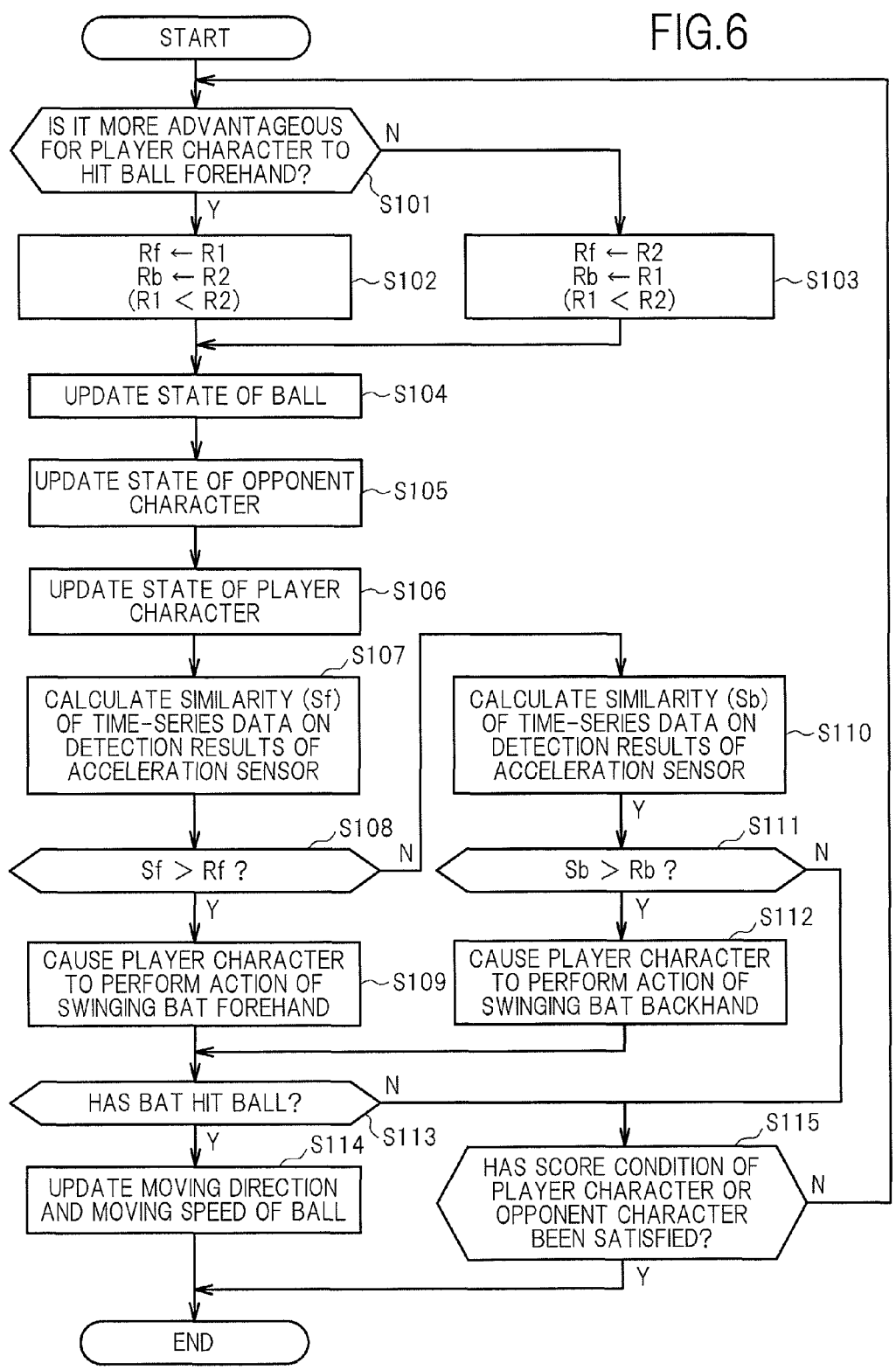
FIG. 6 A flowchart illustrating an example of processing executed by the game device.

Next, description is given of processing executed by the game device 10. FIG. 6 is a flowchart illustrating an example of the processing repeatedly executed within a period after the opponent character 44 hits the ball 42 until the player character 43 hits back the ball 42.

Figure 7:
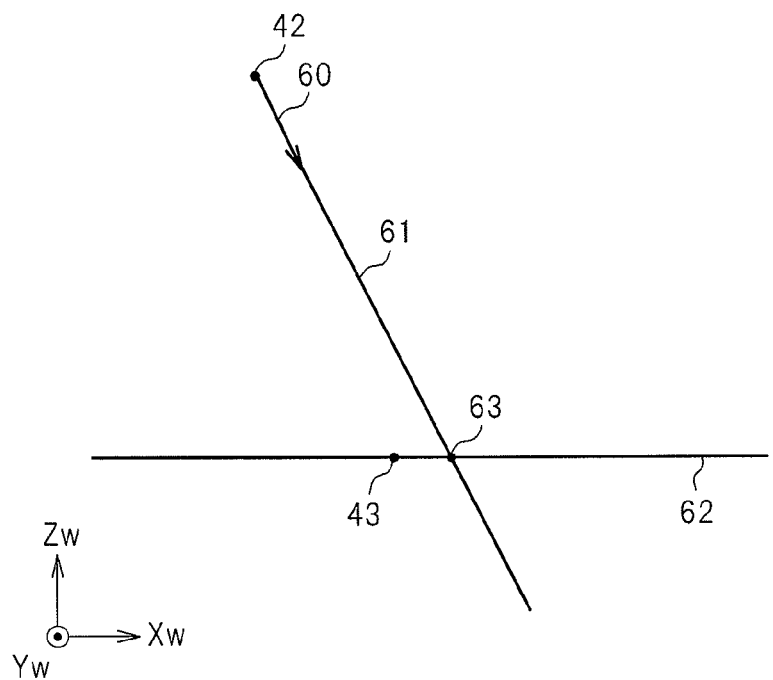
FIG. 7 A diagram illustrating a determination as to whether it is more advantageous for a player character to hit a ball forehand or backhand.

If the opponent character 44 hits the ball 42, as illustrated in FIG. 6, the microprocessor 13 determines whether or not it is more advantageous for the player character 43 to hit back the ball 42 forehand (S101). The determination is performed based on, for example, the positional relationship between the player character 43 and the ball 42 and the moving direction of the ball 42. FIG. 7 is a diagram illustrating the determination.

As illustrated in FIG. 7, in the processing of Step S101, a straight line 61 that extends from the current position of the ball 42 in a moving direction 60 of the ball 42 is acquired. Further, a straight line 62 that passes through the current position of the player character 43 in parallel with the net 41a (Xw-axis) is acquired. In addition, an intersection 63 of the two straight lines 61 and 62 is acquired.

Then, it is determined whether or not the intersection 63 exists on the side of the hand with which the player character 43 is holding the bat 43a. For example, if the player character 43 is holding the bat 43a with the right hand (that is, if the player is holding the controller 21 with the right hand), it is determined whether or not the intersection 63 exists on the right side of the player character 43. In the same manner, if the player character 43 is holding the bat 43a with the left hand (that is, if the player is holding the controller 21 with the left hand), it is determined whether or not the intersection 63 exists on the left side of the player character 43.

If it is determined that the intersection 63 exists on the side of the hand with which the player character 43 is holding the bat 43a, it is determined that it is more advantageous to hit back the ball 42 forehand. On the other hand, if it is determined that the intersection 63 does not exist on the side of the hand with which the player character 43 is holding the bat 43a, that is, if it is determined that the intersection 63 exists on the side of the hand with which the player character 43 is not holding the bat 43a, it is determined that it is less advantageous to hit back the ball 42 forehand and that it is more advantageous to hit back the ball 42 backhand.

If it is determined that it is more advantageous to hit back the ball 42 forehand, the microprocessor 13 (condition changing section 55) sets a reference similarity Rf (first reference similarity) to a constant R1 and a reference similarity Rb (second reference similarity) to a constant R2 (S102).

Note that the reference similarity Rf is used to determine whether or not the player has swung the controller 21 forehand (see Step S108 described later). Further, the reference similarity Rb is used to determine whether or not the player has swung the controller 21 backhand (see Step S111 described later).

Further, the constant R2 is a value larger than the constant R1. That is, here in Step S102, the reference similarity Rf that is used to determine whether or not the player has swung the controller 21 forehand is set to a relatively small value (R1). Further, the reference similarity Rb that is used to determine whether or not the player has swung the controller 21 backhand is set to a relatively large value (R2). In other words, the reference similarity Rb is set so as to make it less likely to be determined that the player has swung the controller 21 backhand.

On the other hand, if it is determined that it is less advantageous to hit back the ball 42 forehand, that is, if it is determined that it is more advantageous to hit back the ball 42 backhand, the microprocessor 13 (condition changing section 55) sets the reference similarity Rf to the constant R2 and the reference similarity Rb to the constant R1 (S103).

That is, in Step S103, the reference similarity Rf that is used to determine whether or not the player has swung the controller 21 forehand is set to the relatively large value (R2). Further, the reference similarity Rb that is used to determine whether or not the player has swung the controller 21 backhand is set to the relatively small value (R1). In other words, the reference similarity Rf is set so as to make it less likely to be determined that the player has swung the controller 21 forehand.

After the processing of Step S102 or S103 is executed, the microprocessor 13 updates the state of the ball 42 (S104). For example, the microprocessor 13 causes the ball 42 to move. Further, the microprocessor 13 updates the state of the opponent character 44 (S105). For example, the microprocessor 13 causes the opponent character 44 to move.

In addition, the microprocessor 13 (control section 52) updates the position of the player character 43 (S106). For example, the microprocessor 13 causes the player character 43 to move so that the player character 43 can hit back the ball 42.

After that, the microprocessor 13 (numerical value information acquiring section 51) acquires the detection result of the acceleration sensor 22 at the present time point, and stores the detection result in the main memory 14. The detection results of the acceleration sensor 22 acquired every predetermined time (for example, 1/60th of a second) within the period between the present time and the predetermined time before is held in the main memory 14 as time-series data. The microprocessor 13 acquires a similarity Sf between time-series data on the detection results of the acceleration sensor 22 within the period between the present time and the predetermined time before and standard time-series data on the detection results of the acceleration sensor 22 obtained when the controller 21 is swung forehand (S107).

As described above, the standard time-series data on the detection results of the acceleration sensor 22 obtained when the controller 21 is swung forehand by being held with the right hand and the standard time-series data on the detection results of the acceleration sensor 22 obtained when the controller 21 is swung forehand by being held with the left hand are stored on the optical disc 32. In Step S107, the former is used when the player is holding the controller 21 with the right hand, and the latter is used when the player is holding the controller 21 with the left hand.

After the similarity Sf is acquired, the microprocessor 13 determines whether or not the similarity Sf is higher than the reference similarity Rf (S108). That is, the microprocessor 13 determines whether or not the player has swung the controller 21 forehand. If the similarity Sf is higher than the reference similarity Rf, that is, if the player has swung the controller 21 forehand, the microprocessor 13 (first control section 53) causes the player character 43 to perform the action of swinging the bat 43*a* forehand (S109).

On the other hand, if it is determined that the similarity Sf is not higher than the reference similarity Rf, the microprocessor 13 acquires a similarity Sb between the time-series data on the detection results of the acceleration sensor 22 within the period between the present time and the predetermined time before and standard time-series data on the detection results of the acceleration sensor 22 obtained when the controller 21 is swung backhand (S110).

As described above, the standard time-series data on the detection results of the acceleration sensor 22 obtained when the controller 21 is swung backhand by being held with the right hand and the standard time-series data on the detection results of the acceleration sensor 22 obtained when the controller 21 is swung backhand by being held with the left hand are stored on the optical disc 32. In Step S110, the former is used when the player is holding the controller 21 with the right hand, and the latter is used when the player is holding the controller 21 with the left hand.

After the similarity Sb is acquired, the microprocessor 13 determines whether or not the similarity Sb is higher than the reference similarity Rb (S111). That is, the microprocessor 13 determines whether or not the player has swung the controller 21 backhand. If the similarity Sb is higher than the reference similarity Rb, that is, if the player has swung the controller 21 backhand, the microprocessor 13 (second control section 54) causes the player character 43 to perform the action of swinging the bat 43*a* backhand (S112).

If the processing of Step S109 or S112 is executed, the microprocessor 13 determines whether or not the bat 43*a* of the player character 43 has hit the ball 42 (S113). For example, if a distance between the player character 43 (bat 43*a*) and the ball 42 obtained at a time point at which the action of swinging the bat 43*a* is performed is less than a reference distance, the microprocessor 13 determines that the bat 43*a* has hit the ball 42.

If it is determined that the bat 43*a* has hit the ball 42, the microprocessor 13 changes a moving speed and the moving direction of the ball 42 (S114). For example, the moving speed and the moving direction of the ball 42 are set based on the positional relationship between the player character 43 (bat 43*a*) and the ball 42 obtained at the time point at which the bat 43*a* is swung.

If it is determined in Step S111 that the similarity Sb is not higher than the reference similarity Rb, or if it is determined in Step S113 that the bat 43*a* has not hit the ball 42, the microprocessor 13 determines whether or not a score condition of the player character 43 or the opponent character 44 has been satisfied (S115).

For example, if the ball 42 hit by the opponent character 44 fails to enter a court on the side of the player character 43 because of hitting the net 41*a* or other such cause, the score condition of the player character 43 is satisfied, and the player character 43 receives a score. Further, for example, if the player character 43 fails to hit back the ball 42 that has been hit by the opponent character 44 and has bounced within the court on the side of the player character 43, the score condition of the opponent character 44 is satisfied, and the opponent character 44 receives a score.

According to the game device 10 described above, it is possible to prevent the player character 43 from performing an action that is not intended by the player.

Note that, the present invention is not limited to the embodiment described above.

Modified Example 1

For example, the game space 40 may be a two-dimensional game space. That is, the positions and the like of the ball 42, the player character 43, and the opponent character 44 may be managed by two-coordinate elements.

Modified Example 2

Further, for example, in Step S108 of FIG. 6, the microprocessor 13 (first control section 53) may determine whether or not the inverse (1/Sf) of the similarity Sf is smaller than (1/Rf). Then, the microprocessor 13 (first control section 53) may cause the player character 43 to perform the action of swinging the bat 43*a* forehand if (1/Sf) is smaller than (1/Rf). That is, the first control section 53 may cause the player character 43 to perform the first action (action of swinging the bat 43*a* forehand) if the first numerical value (1/Sf) obtained based on the numerical value information acquired by the numerical value information acquiring section 51 is smaller than the first reference value (1/Rf).

Note that in this case, in Step S103, the microprocessor 13 (condition changing section 55) sets the value Rf to the constant R2 whose value is larger than the constant R1 to thereby set the first reference value (1/Rf) to a smaller value. That is, the condition changing section 55 sets the first reference value (1/Rf) for the case where the positional relationship between the player character 43 and the ball 42 is the second positional relationship to a value (1/R2) smaller than the first reference value (1/R1) for the case where the positional relationship between the player character 43 and the ball 42 is the first positional relationship.

Further, for example, in Step S111 of FIG. 6, the microprocessor 13 (second control section 54) may determine whether or not the inverse (1/Sb) of the similarity Sb is smaller than (1/Rb). Then, the microprocessor 13 (second control section 54) may cause the player character 43 to perform the action of swinging the bat 43a backhand if (1/Sb) is smaller than (1/Rb). That is, the second control section 54 may cause the player character 43 to perform the second action (action of swinging the bat 43a backhand) if the second numerical value (1/Sb) obtained based on the numerical value information acquired by the numerical value information acquiring section 51 is smaller than the second reference value (1/Rb).

Note that in this case, in Step S102, the microprocessor 13 (condition changing section 55) sets the value Rb to the constant R2 whose value is larger than the constant R1 to thereby set the second reference value (1/Rb) to a smaller value. That is, the condition changing section 55 sets the second reference value (1/Rb) for the case where the positional relationship between the player character 43 and the ball 42 is the first positional relationship to a value (1/R2) smaller than the second reference value (1/R1) for the case where the positional relationship between the player character 43 and the ball 42 is the second positional relationship.

Modified Example 3

In a case where the moving speed of the ball 42 is fast, it is conceivable that the player swings the controller 21 faster than in a case where the moving speed of the ball 42 is slow. If the player swings the controller 21 too fast, a similarity between the time-series data on the detection results of the acceleration sensor 22 which has been acquired in actuality and the standard time-series data on the detection results of the acceleration sensor 22 becomes low, and there is a fear that it may not be recognized that the player has swung the controller 21. As a result, there is a fear that the player character 43 may fail to swing the bat 43a regardless of the fact the player has swung the controller 21. That is, the player character 43 may fail to perform the action that is intended by the player.

Therefore, the condition changing section 55 may change the first condition or of the second condition based on the moving speed of the ball 42.

For example, the condition changing section 55 may change the standard time-series data on the detection results of the acceleration sensor 22 based on the moving speed of the ball 42. In this case, data obtained by associating the moving speed of the ball 42 with the standard time-series data on the detection results of the acceleration sensor 22 may be stored on the optical disc 32. Then, in Step S107 or S110 of FIG. 6, the standard time-series data on the detection results of the acceleration sensor 22 which is associated with the moving speed of the ball 42 at that time point may be used.

Further, for example, the condition changing section 55 may change the reference similarities (Rf and Rb within FIG. 6) based on the moving speed of the ball 42. For example, the condition changing section 55 may set the reference similarities for a case where the moving speed of the ball 42 is faster than a reference speed to a level lower than the reference similarities for a case where the moving speed of the ball 42 is slower than the reference speed. With this configuration, in the case where the moving speed of the ball 42 is faster than the reference speed, the first condition and the second condition are changed so that the first condition and the second condition are more likely to be satisfied than in the case where the moving speed of the ball 42 is slower than the reference speed.

According to Modified Example 3, it is possible to prevent an occurrence of such an inconvenience that the player character 43 fails to perform the action that is intended by the player.

Modified Example 4

Further, for example, a determination method disclosed in JP 2007-241655 A may be used for the determination as to whether the player has swung the controller 21 forehand or backhand.

With the above-mentioned determination method, first, it is determined that the player is swinging the controller 21 in a case where an acceleration of the controller 21 in a Z-axis direction is larger than a gravitational acceleration. This is because although the acceleration larger than the gravitational acceleration is not detected by the acceleration sensor 22 in a case where the controller 21 is stationary, when the player holds and swings the controller 21 forehand or backhand, the acceleration larger than the gravitational acceleration is detected as the acceleration in the Z-axis direction due to an influence of a centrifugal force.

Figure 8:
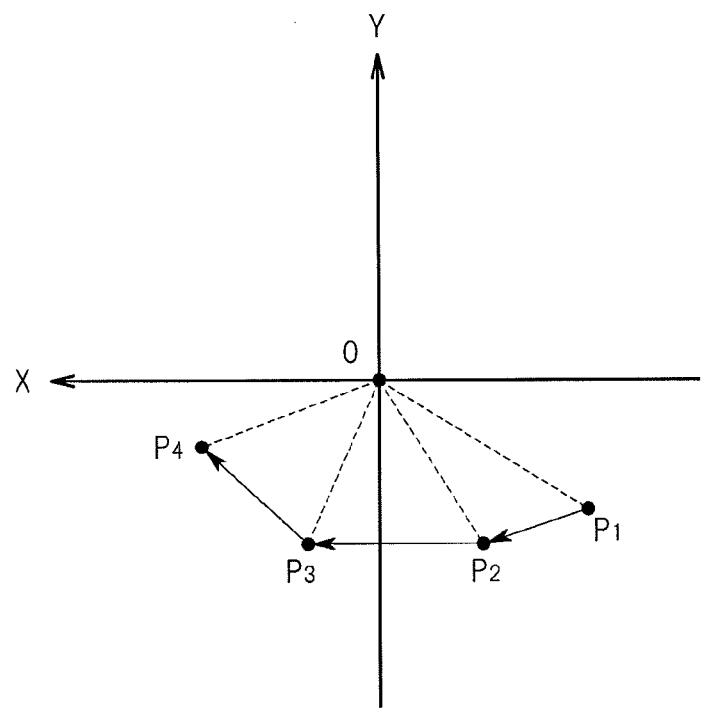
FIG. 8 A diagram illustrating a determination method for determining whether the player has swung the controller forehand or backhand.
Figure 9:
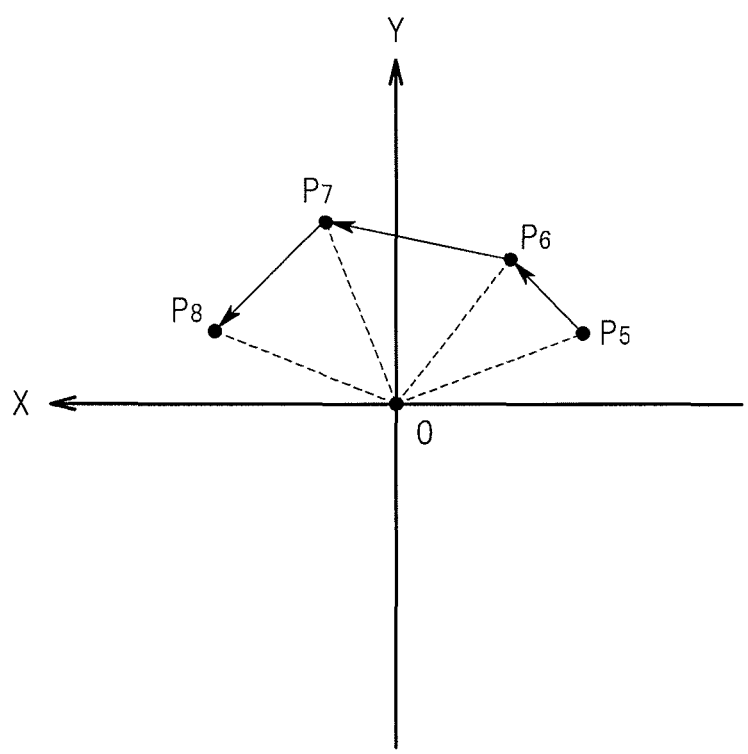
FIG. 9 A diagram illustrating a determination method for determining whether the player has swung the controller forehand or backhand.

Further, with the above-mentioned determination method, whether the player has swung the controller forehand or backhand is determined as described below. FIGS. 8 and 9 are diagrams illustrating the determination method.

FIG. 8 illustrates an example of the detection results (the acceleration in the X-axis direction and the acceleration in the Y-axis direction) of the acceleration sensor 22 obtained every predetermined time (for example, ¹⁄₆₀th of a second) when the player swings the controller 21 forehand, which is expressed in an X-Y coordinate system. In FIG. 8, an X-axis coordinate value corresponds to the acceleration in an X-axis direction, and a Y-axis coordinate value corresponds to the acceleration in a Y-axis direction. Further, the points $P_1$ to $P_4$ within FIG. 8 indicate the detection results of the acceleration sensor 22 acquired in an order of the points $P_1$ to $P_4$.

As illustrated in FIG. 8, when the player swings the controller 21 forehand, the point P progresses clockwise about an origin O of the X-Y coordinate system. The above-mentioned determination method includes calculating an area of a triangle formed by the origin O and two chronologically-successive points P that progress clockwise about the origin O of the X-Y coordinate system. Then, if the total area of triangles becomes larger than the first reference value, it is determined that the player has swung the controller 21 forehand. For example, in the example illustrated in FIG. 8, if the total area of the triangles $OP_1P_2$, $OP_2P_3$, and $OP_3P_4$ becomes larger than the first reference value, it is determined that the player has swung the controller 21 forehand.

In the case of employing the above-mentioned determination method, the "first condition" becomes a condition as to whether or not the total area (first numerical value) of the triangles each formed by the origin O and the two chronologically-successive points P that progress clockwise about the origin O of the X-Y coordinate system is larger than the first reference value. Further, in this case, the condition changing section 55 sets the first reference value for the case where the positional relationship between the player character 43 and the ball 42 is the second positional relationship to a value (for example, C2: C1<C2) larger than the first reference value (for example, C1) for the case where the positional relationship between the player character 43 and the ball 42 is the first positional relationship.

Note that it may be determined that the player has swung the controller 21 forehand if another statistic regarding the detection results of the acceleration sensor 22 becomes larger than the first reference value. For example, in the example illustrated in FIG. 8, it may be determined that the player has swung the controller 21 forehand if the total length of the line segments $OP_1$, $OP_2$, $OP_3$, and $OP_4$ becomes larger than the first reference value.

FIG. 9 illustrates an example of the detection results (the acceleration in the X-axis direction and the acceleration in the Y-axis direction) of the acceleration sensor 22 obtained every predetermined time (for example, ⅙₀th of a second) when the player swings the controller 21 backhand, which is expressed in an X-Y coordinate system. In FIG. 9, an X-axis coordinate value corresponds to the acceleration in an X-axis direction, and a Y-axis coordinate value corresponds to the acceleration in a Y-axis direction. Further, the points $P_5$ to $P_8$ within FIG. 9 indicate the detection results of the acceleration sensor 22 acquired in an order of the points $P_5$ to $P_8$.

As illustrated in FIG. 9, when the player swings the controller 21 backhand, the point P progresses counterclockwise about the origin O of the X-Y coordinate system. The above-mentioned determination method includes calculating an area of a triangle formed by the origin O and two chronologically-successive points P that progress counterclockwise about the origin O of the X-Y coordinate system. Then, if the total area of triangles becomes larger than the second reference value, it is determined that the player has swung the controller 21 backhand. For example, in the example illustrated in FIG. 9, the total area of the triangles $OP_5P_6$, $OP_6P_7$, and $OP_7P_8$ becomes larger than the second reference value, it is determined that the player has swung the controller 21 backhand.

In the case of employing the above-mentioned determination method, the "second condition" becomes a condition as to whether or not the total area (second numerical value) of the triangles each formed by the origin O and the two chronologically-successive points P that progress counterclockwise about the origin O of the X-Y coordinate system is larger than the second reference value. Further, in this case, the condition changing section 55 sets the second reference value for the case where the positional relationship between the player character 43 and the ball 42 is the first positional relationship to a value (for example, C2: C1<C2) larger than the second reference value (for example, C1) for the case where the positional relationship between the player character 43 and the ball 42 is the second positional relationship.

Note that it may be determined that the player has swung the controller 21 backhand if another statistic regarding the detection results of the acceleration sensor 22 becomes larger than the second reference value. For example, in the example illustrated in FIG. 9, it may be determined that the player has swung the controller 21 backhand if the total length of the line segments $OP_5$, $OP_6$, $OP_7$, and $OP_8$ becomes larger than the second reference value.

Modified Example 5

Further, the present invention can be applied to a game other than the table tennis game. For example, the present invention can be applied to a game of a sport similar to a table tennis. Specifically, the present invention can be applied to a tennis game, a badminton game, and the like.

Further, for example, the present invention can be applied to a game other than the sport game. For example, the present invention can be applied to an action game.

For example, the present invention can be applied to a game configured so that a player character holding a weapon (for example, a sword) with the right hand (or left hand) swings the weapon when a player holding the controller 21 with the right hand (or left hand) swings the controller 21.

For example, in this game, the player holding the controller 21 with the right hand swings the controller 21 forehand to thereby eliminate an enemy character that attacks the player character from the right side of the player character. Further, the player holding the controller 21 with the right hand swings the controller 21 backhand to thereby eliminate an enemy character that attacks the player character from the left side of the player character.

In this case, if the numerical value information acquired by the numerical value information acquiring section 51 satisfies the first condition, the first control section 53 causes the player character to perform the first action corresponding to a case where a positional relationship between the player character (subject to be operated) and the enemy character (character) is the first positional relationship.

For example, the "first condition" refers to a condition for determining whether or not the player has swung the controller 21 forehand. The "first condition" refers to a condition regarding the numerical value information acquired by the numerical value information acquiring section 51, and specifically refers to a condition regarding the detection results of the acceleration sensor 22. Further, for example, the "case where a positional relationship between the player character and the enemy character is the first positional relationship" refers to a case where the enemy character is positioned within an area on the side of the hand with which the player character is holding the weapon. The "first action" refers to an action of swinging the weapon such as a sword in the same manner as swinging the bat (racket, paddle) forehand.

If the numerical value information acquired by the numerical value information acquiring section 51 satisfies the second condition, the second control section 54 causes the player character to perform the second action corresponding to a case where a positional relationship between the player character (subject to be operated) and the enemy character (character) is the second positional relationship.

For example, the "second condition" refers to a condition for determining whether or not the player has swung the controller 21 backhand. The "second condition" also refers to a condition regarding the numerical value information acquired by the numerical value information acquiring section 51, and specifically refers to a condition regarding the detection results of the acceleration sensor 22. Further, for example, the "case where a positional relationship between the player character and the enemy character is the second positional relationship" refers to a case where the enemy character is positioned within an area on the side of the hand with which the player character is not holding the weapon. The "second action" refers to an action of swinging the weapon such as a sword in the same manner as swinging the bat (racket, paddle) backhand.

The condition changing section 55 changes the first condition or the second condition based on the positional relationship between the player character and the enemy character.

For example, the condition changing section 55 makes such a setting that the numerical value information acquired by the numerical value information acquiring section 51 is less likely to satisfy the first condition for the case where the positional relationship between the player character and the enemy character is the second positional relationship than the first condition for the case where the positional relationship between the player character and the enemy character is the first positional relationship.

Further, for example, the condition changing section 55 makes such a setting that the numerical value information acquired by the numerical value information acquiring section 51 is less likely to satisfy the second condition for the case where the positional relationship between the player character and the enemy character is the first positional relationship than the second condition for the case where the positional relationship between the player character and the enemy character is the second positional relationship.

Further, in the same manner as in Modified Example 3, the condition changing section 55 may change the first condition and the second condition based on a moving speed of the enemy character.

Note that the present invention can be applied to a game configured so that the player character is attacked by an object instead of the enemy character. For example, in this game, the player holding the controller 21 with the right hand swings the controller 21 forehand to thereby destroy the object that attacks the player character from the right side of the player character. Further, the player holding the controller 21 with the right hand swings the controller 21 backhand to thereby destroy the object that attacks the player character from the left side of the player character.

The invention claimed is:

1. A game device, which executes a game configured so that at least one of a subject to be operated by a player and an object or a character moves within a game space, the game device comprising:
   a numerical value information acquirer that acquires numerical value information corresponding to a motion of the player;
   a controller that controls the subject to be operated to perform an action corresponding to a case where a positional relationship between the subject to be operated and the object or the character is a first positional relationship in a case where the numerical value information satisfies a threshold condition; and
   a condition changer that changes, when the positional relationship between the subject to be operated and the object or the character is a second positional relationship, the threshold condition so that the numerical value information is less likely to satisfy the threshold condition, compared to when the positional relationship between the subject to be operated and the object or the character is the first positional relationship.

2. The game device according to claim 1, wherein:
   the controller controls the subject to be operated to perform the action corresponding to the case where the positional relationship between the subject to be operated and the object or the character is the first positional relationship in a case where a numerical value obtained based on the numerical value information is larger than a reference value; and
   the condition changer sets the reference value for the case where the positional relationship between the subject to be operated and the object or the character is the second positional relationship to a value larger than the reference value for the case where the positional relationship between the subject to be operated and the object or the character is the first positional relationship.

3. The game device according to claim 1, wherein:
   the controller controls the subject to be operated to perform the action corresponding to the case where the positional relationship between the subject to be operated and the object or the character is the first positional relationship in a case where a numerical value obtained based on the numerical value information is smaller than a reference value; and
   the condition changer sets the reference value for the case where the positional relationship between the subject to be operated and the object or the character is the second positional relationship to a value smaller than the reference value for the case where the positional relationship between the subject to be operated and the object or the character is the first positional relationship.

4. The game device according to claim 1, wherein the condition changer changes the threshold condition based on a moving speed of the object or the character.

5. A method of controlling a game device, which comprises at least one processor and executes a game configured so that at least one of a subject to be operated by a player and an object or a character moves within a game space, the method comprising:
   acquiring numerical value information corresponding to a motion of the player;
   controlling, using the at least one processor, the subject to be operated to perform an action corresponding to a case where a positional relationship between the subject to be operated and the object or the character is a first positional relationship in a case where the numerical value information satisfies a threshold condition; and
   changing, using the at least one processor, when the positional relationship between the subject to be operated and the object or the character is a second positional relationship, the threshold condition so that the numerical value information is less likely to satisfy the threshold condition, compared to when the positional relationship between the subject to be operated and the object or the character is the first positional relationship.

6. A non-transitory computer-readable information storage medium storing a program for causing a computer to function as a game device, which executes a game configured so that at least one of a subject to be operated by a player and an object or a character moves within a game space, the program further causing the computer to function as:
   a numerical value information acquiring section that acquires numerical value information corresponding to a motion of the player;
   a control section that controls the subject to be operated to perform an action corresponding to a case where a positional relationship between the subject to be operated and the object or the character is a first positional relationship in a case where the numerical value information satisfies a threshold condition; and
   a condition changing section that changes, when the positional relationship between the subject to be operated and the object or the character is a second positional relationship, the threshold condition so that the numerical value information is less likely to satisfy the threshold condition, compared to when the positional relationship between the subject to be operated and the object or the character is the first positional relationship.

7. A game device, which executes a game configured so that at least one of a subject to be operated by a player and an object or a character moves within a game space, the game device comprising:
   a numerical value information acquirer that acquires numerical value information corresponding to a motion of the player;
   a controller that controls the subject to be operated to perform an action corresponding to a case where a positional relationship between the subject to be operated and the object or the character is a first positional relationship in a case where the numerical value information satisfies a threshold condition; and a condition changer that changes, when the positional relationship between the subject to be operated and the object or the character is the first positional relationship, the threshold condition so that the numerical value information is likely to satisfy the threshold condition, compared to when the positional relationship between the subject to be operated and the object or the character is a second positional relationship.

8. A method of controlling a game device, which comprises at least one processor and executes a game configured so that at least one of a subject to be operated by a player and an object or a character moves within a game space, the method comprising:

acquiring numerical value information corresponding to a motion of the player;

controlling, using the at least one processor, the subject to be operated to perform an action corresponding to a case where a positional relationship between the subject to be operated and the object or the character is a first positional relationship in a case where the numerical value information satisfies a threshold condition; and changing, using the at least one processor, when the positional relationship between the subject to be operated and the object or the character is the first positional relationship, the threshold condition so that the numerical value information is likely to satisfy the threshold condition, compared to when the positional relationship between the subject to be operated and the object or the character is a second positional relationship.

9. A non-transitory computer-readable information storage medium storing a program for causing a computer to function as a game device, which executes a game configured so that at least one of a subject to be operated by a player and an object or a character moves within a game space, the program further causing the computer to function as:

a numerical value information acquiring section that acquires numerical value information corresponding to a motion of the player;

a control section that controls the subject to be operated to perform an action corresponding to a case where a positional relationship between the subject to be operated and the object or the character is a first positional relationship in a case where the numerical value information satisfies a threshold condition; and a condition changing section that changes, when the positional relationship between the subject to be operated and the object or the character is the first positional relationship, the threshold condition so that the numerical value information is likely to satisfy the threshold condition, compared to when the positional relationship between the subject to be operated and the object or the character is a second positional relationship.

10. A game device which executes a game configured to move at least one of a subject to be operated by a player, and an object or a character, within a game space, the game device comprising:

a controller that:

acquires sensor data corresponding to a motion of the player; and performs a first action in a first positional relationship between the subject and the object or the character when the sensor data satisfies a first condition, and changes a second condition in order that the sensor data is less likely to satisfy the second condition than the first condition, the second condition being for performing a second action in a second positional relationship between the subject and the object or the character and being a different relationship than the first positional relationship.

11. A game device which executes a game configured to move at least one of a subject to be operated by a player, and an object or a character, within a game space, the game device comprising:

a controller that:

acquires sensor data corresponding to a motion of the player; and performs a forehand play or a backhand play between the subject and the object or the character according to whether the sensor data satisfies a forehand play condition or a backhand play condition, respectively, and the controller changes the forehand play condition or the backhand play condition based on a current positional relationship between the subject and the object or character.

12. The game device according to claim 11, wherein:

when the current positional relationship between the subject and the object or character is a forehand position, the controller changes the backhand play condition in order that the sensor data is less likely to satisfy the backhand play condition than the forehand play condition, and when the current positional relationship between the subject and the object or character is a backhand position, the controller changes the forehand play condition in order that the sensor data is less likely to satisfy the forehand play condition than the backhand play condition.

13. The game device according to claim 12, wherein the current positional relationship is determined based on a moving direction of the subject with respect to the object or the character.

14. The game device according to claim 11, wherein the forehand play condition is determined by comparing a changing pattern of the sensor data within a time period with a reference changing pattern for a forehand play, and the backhand play condition is determined by comparing the changing pattern of the sensor data within the time period with a reference changing pattern for a backhand play.

15. The game device according to claim 11, wherein reference change patterns of the forehand play and the backhand play are set in advance.

16. The game device according to claim 11, wherein the sensor data is sensor data of an acceleration sensor.

17. A method of controlling a game device, which comprises at least one processor and executes a game configured so that at least one of a subject to be operated by a player and an object or a character moves within a game space, the method comprising:

acquiring sensor data corresponding to a motion of the player; and performing, using the at least one processor, a first action in a first positional relationship between the subject and the object or the character when the sensor data satisfies a first condition, and changing, using the at least one processor, a second condition in order that the sensor data is less likely to satisfy the second condition than the first condition, the second condition being for performing a second action in a second positional relationship between the subject and the object or the character and being a different relationship than the first positional relationship.

18. A non-transitory computer-readable information storage medium storing a program for causing a computer to function as a game device, which executes a game configured so that at least one of a subject to be operated by a player and an object or a character moves within a game space, the program further causing the computer to function as:
   a controller that:
   acquires sensor data corresponding to a motion of the player; and
   performs a first action in a first positional relationship between the subject and the object or the character when the sensor data satisfies a first condition, and changes a second condition in order that the sensor data is less likely to satisfy the second condition than the first condition, the second condition being for performing a second action in a second positional relationship between the subject and the object or the character and being a different relationship than the first positional relationship.

19. A method of controlling a game device, which comprises at least one processor and executes a game configured so that at least one of a subject to be operated by a player and an object or a character moves within a game space, the method comprising:
   acquiring sensor data corresponding to a motion of the player; and
   performing, using the at least one processor, a forehand play or a backhand play between the subject and the object or the character according to whether the sensor data satisfies a forehand play condition or a backhand play condition, respectively, and changing, using the at least one processor, the forehand play condition or the backhand play condition based on a current positional relationship between the subject and the object or character.

20. A non-transitory computer-readable information storage medium storing a program for causing a computer to function as a game device, which executes a game configured so that at least one of a subject to be operated by a player and an object or a character moves within a game space, the program further causing the computer to function as:
   a controller that
   acquires sensor data corresponding to a motion of the player; and
   performs a forehand play or a backhand play between the subject and the object or the character according to whether the sensor data satisfies a forehand play condition or a backhand play condition, respectively, and the controller changes the forehand play condition or the backhand play condition based on a current positional relationship between the subject and the object or character.

* * * * *